(12) United States Patent
    Pearson

(10) Patent No.: US 11,448,755 B2
(45) Date of Patent: Sep. 20, 2022

(54) SYSTEM AND TECHNIQUES FOR SPLIT-APERTURE BEAMFORMING

(71) Applicant: CODA OCTOPUS GROUP, INC., Orlando, FL (US)

(72) Inventor: Charlie Pearson, Ilkley (GB)

(73) Assignee: CODA OCTOPUS GROUP, INC., Orlando, FL (US)

( * ) Notice: Subject to any disclaimer, the term of this patent is extended or adjusted under 35 U.S.C. 154(b) by 258 days.

(21) Appl. No.: 17/025,647

(22) Filed: Sep. 18, 2020

(65) Prior Publication Data

US 2022/0091260 A1 Mar. 24, 2022

(51) Int. Cl.
   *G01S 15/89* (2006.01)
   *G06T 15/08* (2011.01)
   *G01S 7/52* (2006.01)

(52) U.S. Cl.
   CPC ...... *G01S 15/8993* (2013.01); *G01S 7/52046* (2013.01); *G01S 15/8961* (2013.01); *G06T 15/08* (2013.01)

(58) Field of Classification Search
   CPC ............. G01S 15/8993; G01S 7/52046; G01S 15/8961; G01S 7/52003; G01S 15/89; G06T 15/08; G10K 11/341; G10K 11/346
   See application file for complete search history.

(56) References Cited

U.S. PATENT DOCUMENTS

| | | | |
|---|---|---|---|
| 6,438,071 B1 | 8/2002 | Hansen et al. | |
| 7,466,628 B2 | 12/2008 | Hansen | |
| 7,489,592 B2 | 2/2009 | Hansen | |
| 7,898,902 B2 | 3/2011 | Sloss | |
| 8,059,486 B2 | 11/2011 | Sloss | |
| 8,854,920 B2 | 10/2014 | Sloss | |
| 9,019,795 B2 | 4/2015 | Sloss | |
| 10,088,566 B2 | 10/2018 | Sloss | |
| 10,718,865 B2 | 7/2020 | Sloss | |
| 2019/0265343 A1 | 8/2019 | Sloss | |

(Continued)

OTHER PUBLICATIONS

Kongsberg, "Bringing Clarity to the World Below," accessed online at: https://www.kongsberg.com/globalassets/maritime/km-products/product-documents/the-complete-underwater-mapping-product-range, available at least as early as Sep. 18, 2020.

(Continued)

*Primary Examiner* — Daniel Pihulic
(74) *Attorney, Agent, or Firm* — Barnes & Thornburg LLP

(57) ABSTRACT

Technologies for correcting beamformed data are disclosed. A sonar computing device receives, at two or more sets of two-dimensional (2D) subarrays of a multi-element detector array, raw data representing a three-dimensional (3D) volumetric view of a space. A first set of subarrays of the two or more sets of subarrays includes elements of the detector array along a first direction. A second set of subarrays of the two or more sets of subarrays includes elements of the detector array along a second direction. The raw data is subdivided into slices and beamformed. The beamformed data is corrected by, per slice, obtaining first phase data from the first set, obtaining second phase data from the second set, correcting a beam position of each beam in the first and second directions per voxel based on the first and second phase data, and interpolating the corrected beam positions to an output grid.

20 Claims, 13 Drawing Sheets

(56) References Cited

U.S. PATENT DOCUMENTS

| | | |
|---|---|---|
| 2019/0317211 A1 | 10/2019 | Sloss |
| 2019/0346565 A1 | 11/2019 | Sloss |
| 2021/0141087 A1* | 5/2021 | Cunningham .......... G01S 15/42 |
| 2022/0026570 A1* | 1/2022 | Cunningham .......... G01S 7/539 |
| 2022/0091260 A1* | 3/2022 | Pearson .............. G01S 15/8961 |

OTHER PUBLICATIONS

Yang et al., Multibeam Sonar Bottom Detection Using Multiple Subarrays, *Oceans '97. MTS/IEEE Conference Proceedings*, Halifax, NS, Canada, 1997, pp. 932-938 vol. 2.

* cited by examiner

402

SYSTEM AND TECHNIQUES FOR SPLIT-APERTURE BEAMFORMING

FIELD

Embodiments presented herein generally relate to sonar imaging, and more specifically, to correcting data point positions of beamformed sonar data.

BACKGROUND

A sonar generator may produce sonar imaging data by sending one or more sonar signal pulses into a volume of fluid, also known as insonifying the volume of fluid. Doing so causes objects within the insonified volume to reflect sound energy. One or more detector elements of a detector array may record the reflected sound energy. Generally, this process of transmitting sonar pulses, or pings, is repeated at a given frequency. Once the detector array receives reflected pings, each detector element may digitize and condition an analog electrical voltage signal to provide raw data indicative of the reflected sonar wave phase and magnitude for each detector. Thereafter, the detector array may transform the raw data into beamformed data, which provides points representative of the location in a three-dimensional (3D) space from where the signals were reflected.

Beamforming generally relates to techniques for generating, from the raw data, a 3D array of values (e.g., magnitude and phase) corresponding to measurements within an insonified volume for a given ping. This 3D array representing a cuboid view volume is also referred to herein as full time series data or beamformed data or data in "beam space." Through further processing and optionally visualization, the cuboid view volume of full time series data may be transformed into "world space," in which the data is represented in three dimensional polar space coordinates as a function of distance or range and of two orthogonal angles with respect to the position and orientation of detectors. However, current beamforming techniques may generate data yielding "fuzzy" output, for example in images for visualization. Such output is a function of the geometry and physics of the underlying process. Particularly, multiple overlapping beams may intersect a surface at a relatively high incidence angle, in which only one of the points actually represents the true position of the surface, with the remaining points having some error. Consequently, the images do not clearly and accurately resolve the exact position of a surface, which can be problematic, e.g., in use cases such as survey operations in which measurement of objects in the images is often required.

SUMMARY

One embodiment presented herein discloses a method for correcting beamformed data. The method generally includes receiving, by a sonar computing device at two or more sets of two-dimensional (2D) subarrays of a detector array comprising a plurality of elements, raw data representing a three-dimensional (3D) volumetric view of a space, wherein a first set of 2D subarrays of the two or more sets of 2D subarrays includes elements of the detector array along a first direction and wherein a second set of 2D subarrays of the two or more sets of 2D subarrays includes elements of the detector array along a second direction. The method also generally includes subdividing, by the sonar computing device, the raw data into a plurality of slices, each slice corresponding to raw data received at a given range from the detector array and beamforming, by the sonar computing device, the raw data to obtain a plurality of beams. The method also generally includes correcting resulting beamformed data of the beamforming by, for at least one of the plurality of data slices: obtaining, by the sonar computing device, first phase data from a first subset of the first set of 2D subarrays, obtaining, by the sonar computing device, second phase data from a second subset of the second set of 2D subarrays, correcting, by the sonar computing device, a beam position of each of the plurality of beams in the first direction and the second direction per voxel based on the first phase data and the second phase data, and interpolating, by the sonar computing device, the corrected beam position of each of the plurality of beams to an output grid.

Another embodiment presented herein discloses a sonar computing device having a processor, a detector array having a plurality of elements, and a memory storing a plurality of instructions. When executed, the plurality of instructions causes the sonar computing device to receive, at two or more sets of two-dimensional subarrays of the detector array, raw data representing a three-dimensional volumetric view of a space, wherein a first set of 2D subarrays of the two or more sets of 2D subarrays includes elements of the detector array along a first direction and wherein a second set of 2D subarrays of the two or more sets of 2D subarrays includes elements of the detector array along a second direction. The plurality of instructions further causes the sonar computing device to subdivide the raw data into a plurality of slices, each slice corresponding to raw data received at a given range from the detector array and beamform the raw data to obtain a plurality of beams. The plurality of instructions further causes the sonar computing device to correct resulting beamformed data of the beamforming by, for at least one of the plurality of data slices: obtaining first phase data from a first subset of the first set of 2D subarrays, obtaining second phase data from a second subset of the second set of 2D subarrays, correcting a beam position of each of the plurality of beams in the first direction and the second direction per voxel based on the first phase data and the second phase data, and interpolating the corrected beam position of each of the plurality of beams to an output grid.

Yet another embodiment presented herein discloses one or more machine-readable storage media having a plurality of instructions, which, when executed on a processor, causes a sonar computing device to receive, at two or more sets of two-dimensional subarrays of the detector array, raw data representing a three-dimensional volumetric view of a space, wherein a first set of 2D subarrays of the two or more sets of 2D subarrays includes elements of the detector array along a first direction and wherein a second set of 2D subarrays of the two or more sets of 2D subarrays includes elements of the detector array along a second direction. The plurality of instructions further causes the sonar computing device to subdivide the raw data into a plurality of slices, each slice corresponding to raw data received at a given range from the detector array and beamform the raw data to obtain a plurality of beams. The plurality of instructions further causes the sonar computing device to correct resulting beamformed data of the beamforming by, for at least one of the plurality of data slices: obtaining first phase data from a first subset of the first set of 2D subarrays, obtaining second phase data from a second subset of the second set of 2D subarrays, correcting a beam position of each of the plurality of beams in the first direction and the second direction per voxel based on the first phase data and the second phase data, and interpolating the corrected beam position of each of the plurality of beams to an output grid.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
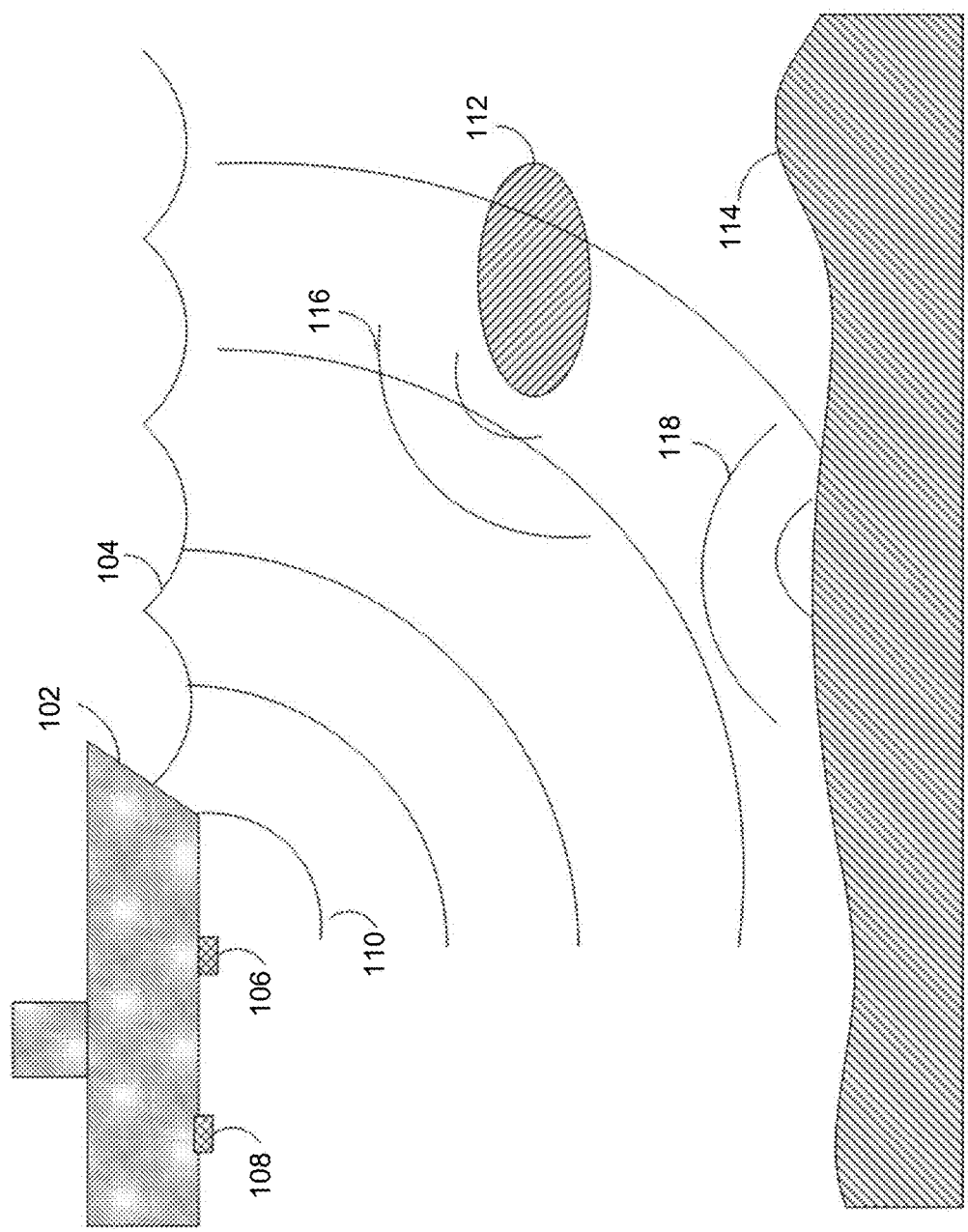
FIG. 1 is a simplified conceptual diagram of at least one embodiment of an example underwater environment in which sonar imaging data is processed.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Generally, a sonar computing device may include a 2D multi-element detector array that obtains an amount of raw data underwater. An example sonar computing device 700 is described herein with regard to FIG. 7. The sonar computing device, for example, prior to transmitting the data to a vessel system (e.g., for visualization or storage), preprocesses the data using techniques such as beamforming. Beamforming the data may create full time series data or beamformed data that represents the underlying view volume of the space in front of a sonar sensor, in which the view volume is segmented into a regularly spaced three dimensional grid of voxels, each voxel being identified by its coordinates in a three-dimensional space and including a value or values, for example of phase and magnitude at its center. This grid of voxels can be subdivided into slices, each slice representative of the data received by the 2D multi-element detector array at a given time. The full time series beamforming process may yield a number of beams, each comprising multiple data points associated with multiple voxels in multiple slices per beam. As a given beam passes through a surface at an angle (e.g., an object with a high incidence angle relative to the receiver), the relationship between the angle of incidence, the beam width, and the slice spacing may result in an error in the estimated location of data points in the grid of voxels in the view volume. That is, data points in the resulting beamformed data may sometimes be subject to a degree of error with respect to angular position associated with beams in the beamformed data, causing "fuzzy" output in resulting data, for example images. Without correction, it may be difficult to ascertain, from the resulting images, the true position of the surface in the full time series data or world space.

To address these issues, embodiments presented herein disclose a system and techniques for correcting beamformed data, including angular positions of underlying data points associated with beamformed output. Particularly, embodiments provide a split-aperture approach in two-dimensional space. As stated, the sonar computing device includes a multi-element detector array. The multi-element detector array may be a 2D array of receiver elements, allowing the array to beamform time slices in 2D, thereby building a fully 3D output from a single ping. As further described herein, in an embodiment, the multi-element detector array can be subdivided into two or more sets of subarrays, at least one of the sets of subarrays arranged along a given direction (e.g., a horizontal direction) and at least one of the sets of subarrays arranged along another direction (e.g., a vertical direction). For each subarray in a set of subarrays, beamformed slices may be generated, in which data, such as phase and magnitude values are associated with at least a subset of given voxels within at least one beamformed slice. Doing so allows for comparison (e.g., by the sonar computing device) of the phases associated with a given voxel relative to the centers of the respective subarrays in the set of subarrays used to generate the beamformed phase data. The phase of a signal calculated using one subarray in a set of subarrays arriving from a given voxel position with respect to the center of the subarray will differ from the phase of signal calculated from a second subarray in the set of subarrays with respect to its center due to the separation between subarrays, and the expected phase difference between two or more subarrays can be computed for a given voxel position, based on the geometry of the configuration. By comparing an actual measured phase difference with the expected phase difference for a given beam angle, an angular correction for each beam from at least one subarray in a set of subarrays can be measured and applied.

The techniques described herein may be adapted to a computing device, such as a sonar computing device having a sonar signal generator that produces and emits sonar signals underwater. The sonar computing device may include a multi-element detector array and transducer for receiving and processing reflected signals according to the embodiments disclosed herein.

Advantageously, embodiments disclosed herein provide an approach for extending split-aperture methods on beamformed data to a 3D space. More specifically, split-aperture processing is performed in two non-parallel directions by two sets of subarrays, which results in a 2D angular correction vector for each voxel in every slice of beamformed output. Further, because the split-aperture processing is performed on each beamformed slice, multiple corrected points may be returned for each beam.

Referring now to FIG. 1, an example underwater environment 100 in which sonar imaging data is obtained and processed is shown. Illustratively, FIG. 1 depicts a sea vessel 102 atop an ocean 104. The sea vessel 102 may be embodied as any water vehicle capable of traveling a body of water, such as the ocean 104. The sea vessel 102 includes a number of sound navigation and ranging (SONAR) equipment, such as a sonar generator 106 and a detector 108. In an embodiment, the detector 108 may correspond to a multi-element detector array. Although depicted as separate components, the sonar generator 106 and detector 108 may be incorporated into a single sonar computing device. The sonar computing device may be adapted to a variety of settings, such as being attached to a cable or wire from the sea vessel 102, embodied within a robot, embodied within a remotely operated vehicle, and the like. Further, the sonar computing device (and individual components such as the sonar generator 106 and the detector 108) may include communication circuitry to send data collected and processed (e.g., segmentation data) to a remote device, such as a management console located within the sea vessel 102.

In an embodiment, the sonar generator 106 produces a sonar pulse. Illustratively, the sonar generator 106 insonifies a volume of fluid by transmitting a series of sound waves 110 at a given frequency in a relatively conical shape. The pulses of the sound waves 110 are generally short (e.g., within a range of 10 to 100 microseconds) and spread relatively broadly over an angular range. Using known sonar-based techniques, the sonar equipment of the sea vessel 102 may derive raw imaging data indicative of an underwater scene from signals reflected by objects in the sea and received by the detector 108. Objects within range of the sound waves 110, such as a suspended object 112, seabed 114, or objects buried under the seabed 114 may reflect the sound waves, shown as sound waves 116 and 118 for the suspended object 112 and the seabed 114, respectively. Sound waves may also be re-reflected from the water surface of the ocean 104. Generally, a reflected ping signal (e.g., corresponding to sound waves 116 or 118) may arrive at the detector 108 in approximately twice the time taken for a ping signal (e.g., corresponding to sound waves 110) to travel to an object in the insonified volume. A measurement of time continues until the reflected ping signal of a furthest object of interest reaches the detector 108. The total measurement time may be subdivided into time slices at fixed intervals, and the interval may be set to match a predetermined range resolution and a corresponding temporal resolution, $t_s$. Once the detector 108 receives reflected ping signals, each detector element may digitize and condition an analog electrical voltage signal to provide raw data representing reflected sonar wave phase and magnitude in each time slice.

The sonar generator 106 may use a master oscillator square wave to provide pulses at a frequency $4f$ timed to edges of the master oscillator square wave. As a result, each element in the detector 108 may sample a received signal at phases 0, 90, 180, and 270 degrees of the master oscillator square wave. Sampling at 0 and 180 degrees provides real parts, and sampling at 90 and 270 degrees provides the imaginary parts of the reflected sound wave with respect to the master oscillator square wave. The sum of the squares of the real and imaginary parts provide the magnitude of the sound wave at each individual detector, and the ratio of the real and imaginary parts is the tangent of the phase angle. The detector 108 may sample the sound wave pressure with 12- or 16-bit accuracy. The reflected ping signals may be subdivided into a series of time slices having a temporal resolution, $t_s$, and a range resolution, $l_s$. While different values for a slice spacing, pulse length, and sonar wavelength may be used, in practice, a slice spacing of 3 cm, a pulse length of 7 cm, and a sonar wavelength of 4 mm may produce desired results. Each time slice is numbered from $t_1$ to $t_n$. Thus, for each time slice, the detector 108 may apply a quadrature filter and digitize the signal. Doing so generates a 12- or 16-bit imaginary number which gives the phase and magnitude of the reflected wave measured by each detector for that time slice.

The detector 108 may use beamforming techniques on the digitized data to provide points in a three-dimensional (3D) space. The beamforming techniques may return beamformed data representing a view volume. More particularly, the beamformed data, also referred to herein as full time series data, is a 3D array of values (e.g., phase, magnitude, etc.) corresponding to measurements from points contained within a given insonified volume for a given ping. Each value is associated with a given voxel in the 3D space. The 3D array may represent a roughly conical volume in world space. In some cases, the voxel data may represent mosaicked multi-ping 3D sonar data of an insonified volume, in which a voxel includes at least the number of mosaicked 3D data sets including a signal at a given region of an insonified volume.

Figure 2:
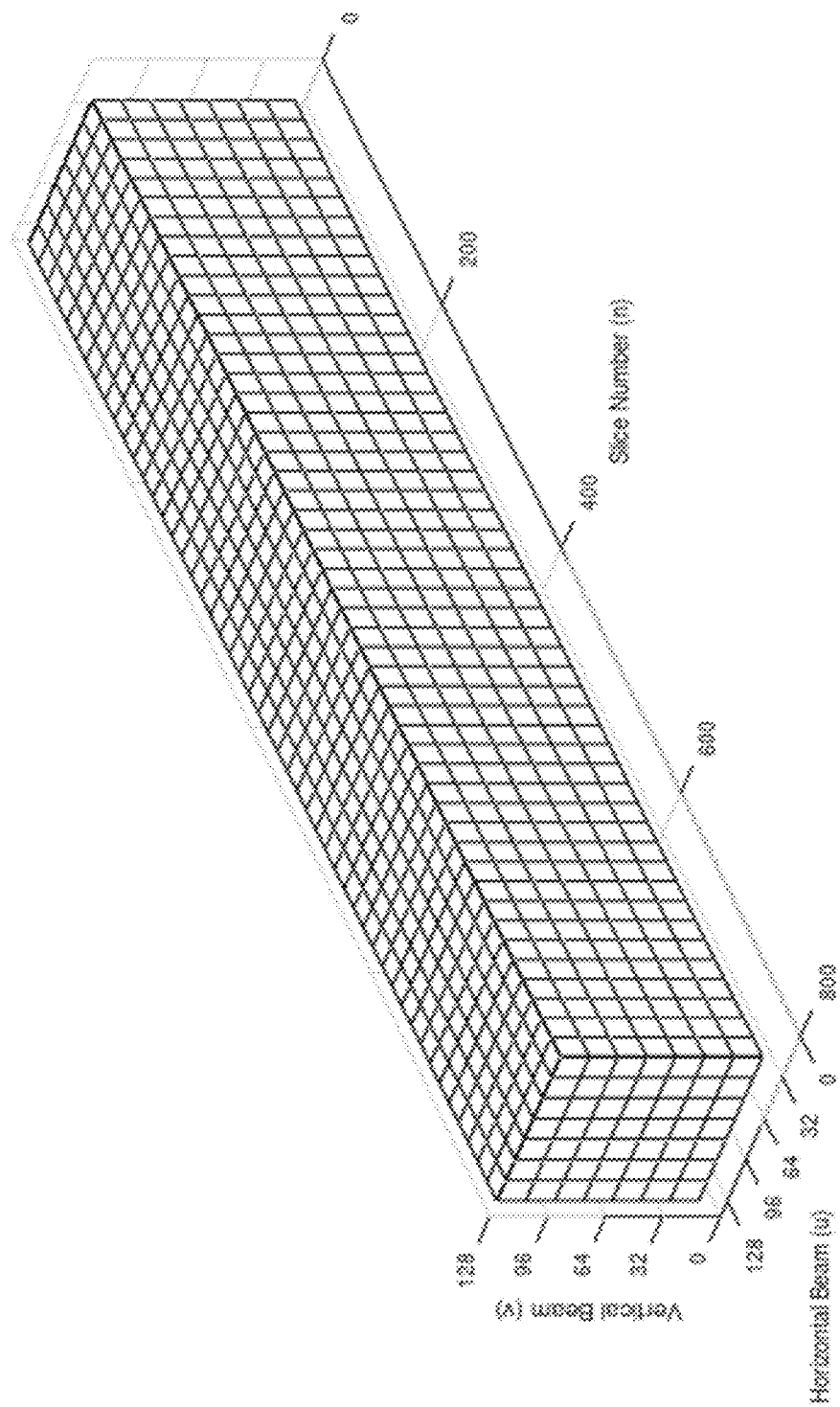
FIG. 2 is a conceptual diagram of an example view volume representation of beamformed data.

In an embodiment, the view volume may be represented as a cuboid. FIG. 2 shows an example of a cuboid 200 representing a view volume. Generally, the cuboid 200 represents a space facing the detector 108 within a given field of view (FoV$_u$ by FoV$_v$) that extends along an horizontal direction from a minimum value -FoV$_u$/2 to a maximum value FoV$_u$/2; along the vertical direction from a minimum value of -FoV$_v$/2 to a maximum value of FoV$_v$/2; and along the range direction from a minimum range Min$_{Range}$ to a maximum range Max$_{Range}$. Illustratively, the view volume is quantized in U, V and range to discrete values, splitting or segmenting the volume into a regularly spaced 3D grid of voxels, each voxel including at least one measured value (e.g., phase, magnitude, etc.) and positional information for the measured value. The voxels with the same value of range are at the same distance, which may be referred to as a "slice." The U and V values correspond to beam angles with the center of a given slice at (0, 0). Each voxel may be identified by its coordinates in U, V and range and a phase and a magnitude value.

Figure 3:
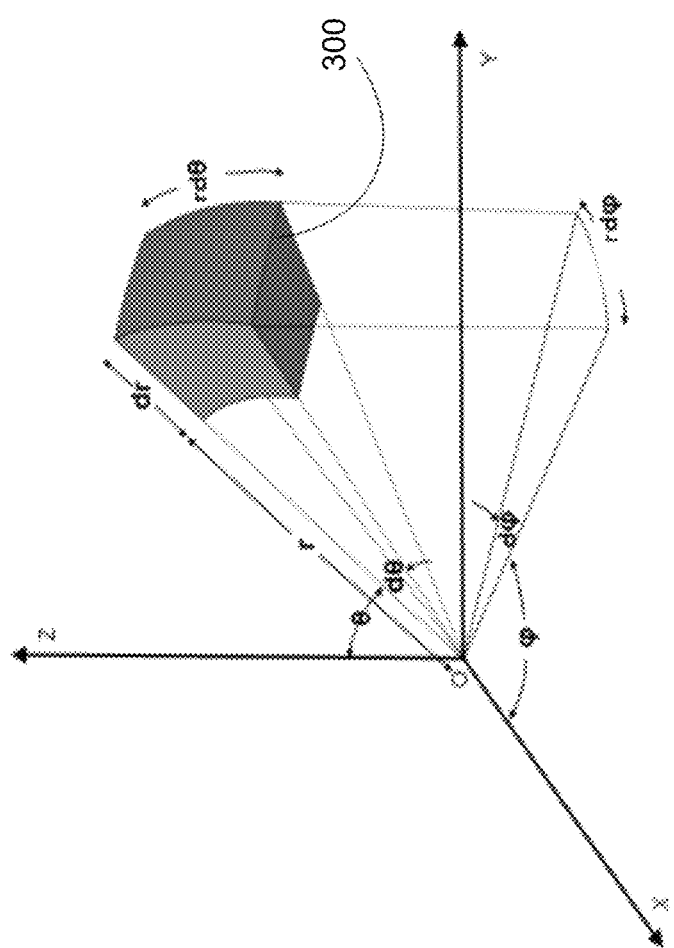
FIG. 3 is a conceptual diagram of an example coordinate system for a three-dimensional world space.

Further, in an embodiment, the sonar computing device may transform the view volume depicted in cuboid 200 into world space, in which data is represented in 3D space polar coordinates as a function of range and of two orthogonal angles relative to the plane of the detector 108. Doing so allows the sonar computing device to perform further processing and visualization with the data. Referring now to FIG. 3, a coordinate system in which one subsection of length δr having lateral dimensions rδθ and rδφ is shown. As shown, the central point of the subsection 300 is located at range r and two orthogonal angular coordinates θ and φ. In world space, volume and component subsections corresponding to voxels in volume space may be represented by 3D pyramidal frusta including truncated pyramidal sections of a sphere between two radii.

Figure 4A:
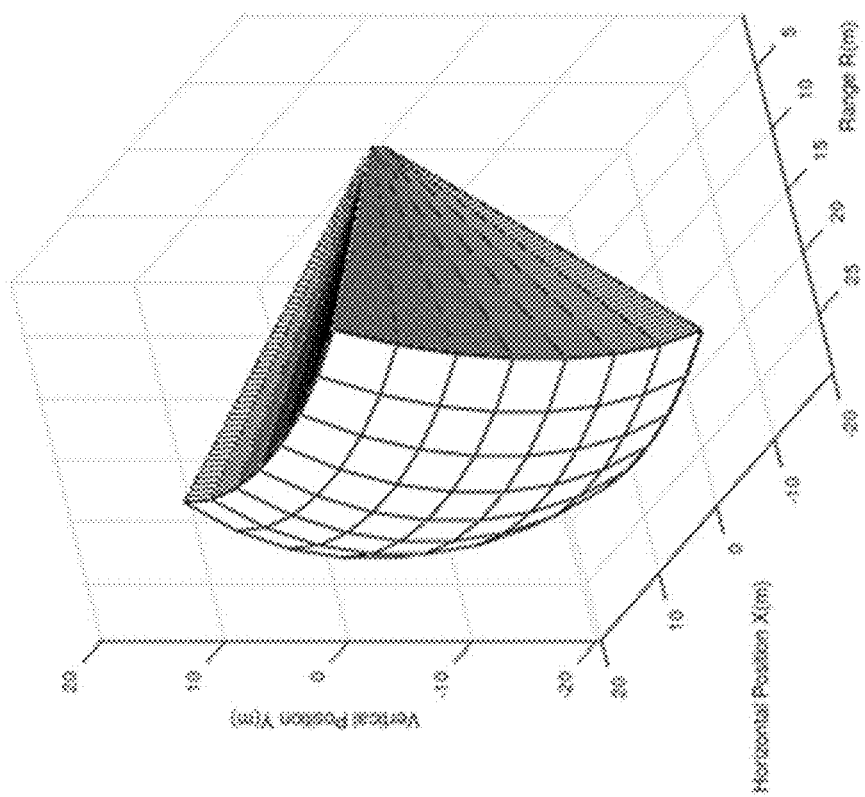
FIG. 4A is a conceptual diagram of a volume of space of interest divided into a number of subsections corresponding to voxels of a view volume after transformation into world space.
Figure 4B:
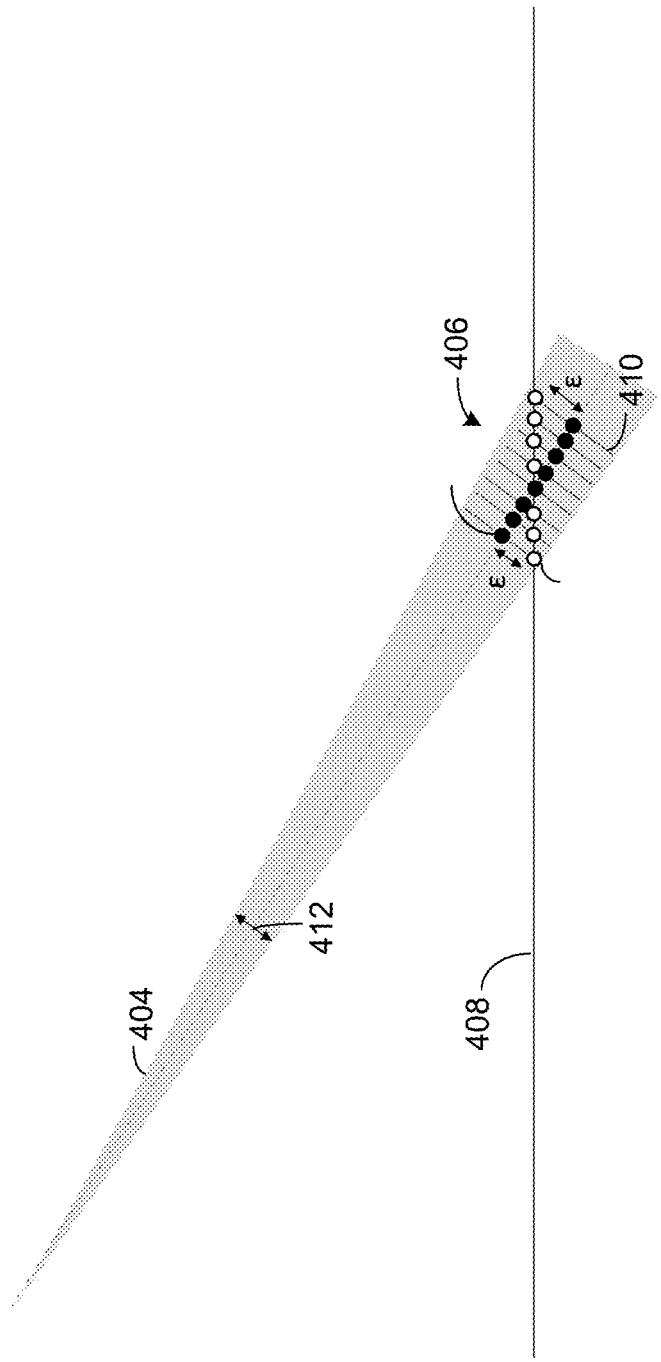
FIG. 4B is a conceptual diagram of examples of errors that may be present in beamformed data.

Referring briefly to FIG. 4A, as shown, a volume 402 of space of interest may be divided into a number of subsections corresponding to voxels of the full time series data. A beam corresponds to a set of touching subsections, wherein θ, φ, δθ and δφ are fixed, and r runs from $r_{min}$ to $r_{max}$. A beam represented by a set $S_{r\theta\phi}$ has length Nδr, where Nδr is the distance between $r_{min}$ and $r_{max}$, with voxels of the same length δr and increasing values rδθ and rδφ. Thus, the area of the beam is continually increasing further from the origin. In some cases, a beamformer may potentially introduce errors as multiple overlapping beams intersect a surface at a high incidence angle. For instance, some beamformers may return multiple data points as a beam passes through a surface, resulting in surfaces appearing as thick in an output image without any angular correction. Examples of errors that may be introduced are illustrated in FIG. 4B. FIG. 4B depicts a beam 404 in a beamformed data volume. In this example, the beam 404 includes multiple data points 406 representative of a sonar signal reflected from a shallow seabed 408, in which the white data points correspond to an actual reflector location and the black points correspond to an estimated reflector location. The data points 406 correspond to the reflected seabed signal at different time points and are therefore assigned to different slices 410. Due to width 410 of the beam and the shallow angle of reflectance of the signal from the seabed, an error $\varepsilon_{slice}$ is present in all but one data point location when the data points are assigned to the grid of voxels in the view volume at coordinates corresponding to the center of the beam for each given slice.

To address these issues, split-aperture methods may be applied according to the embodiments described herein to determine phase information (e.g., measured and expected phase values) to be used to generate a beam correction in two dimensions. Particularly, the elements of detector 108 may be subdivided into multiple subarrays, with at least one set of the subarrays being formed in a first direction, such as in a horizontal configuration, and another set of the subarrays being formed in a second direction non-parallel to the first direction, such as in a vertical configuration. In an embodiment, the subarrays in a given set are overlapping and share one or more elements. For example, the ratio of array aperture to separation distance is 2.5, which results in an array element overlap of 60%. In a further embodiment, the totality of at least one set of subarrays may include all elements of the detector 108, which allows for more precision in beam correction.

Figure 5A:
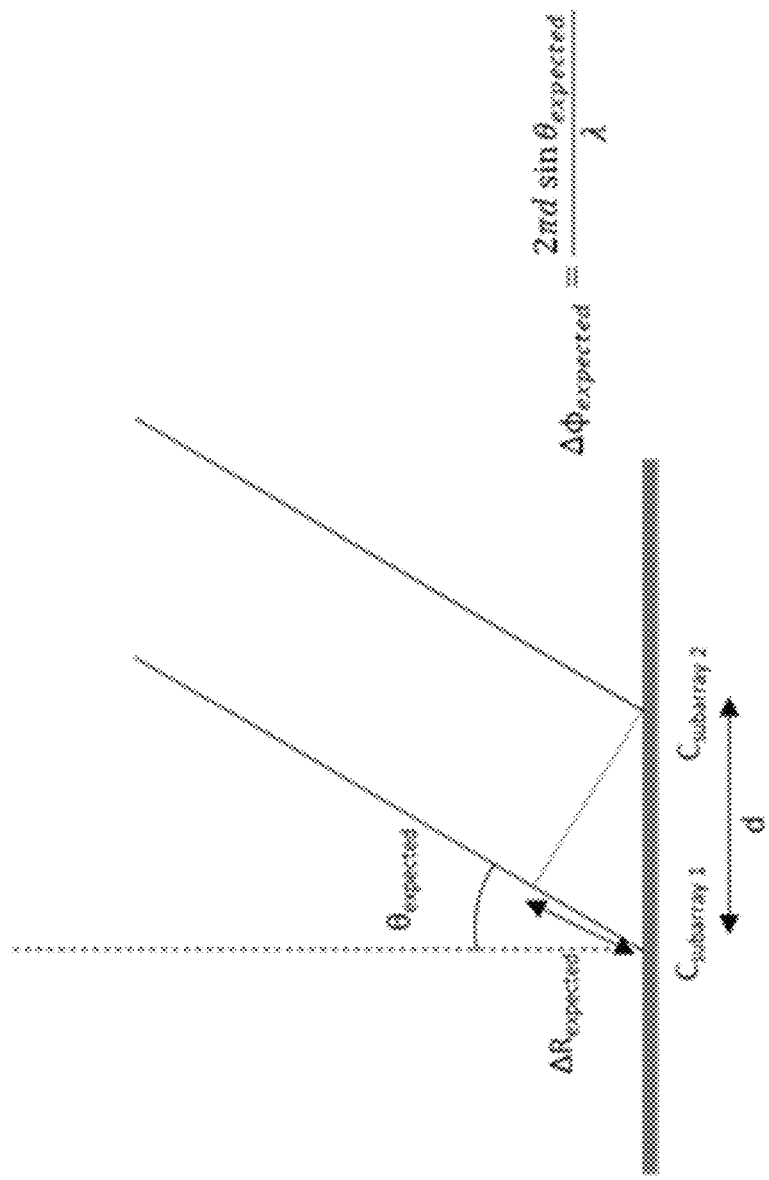
FIGS. 5A-5C are conceptual diagrams of phase characteristics of expected and observed beam angles in a beamform.

Using raw data generated by detector elements of a given subarray in a set of subarrays, the beamforming process may generate 3D beamformed data subdivided into slices which are in turn subdivided into voxels. As stated, each voxel in the 3D beamformed data may be associated with a phase value and magnitude. Subdividing the multi-element detector array 108 into multiple subarrays of elements entails that the centers of the subarrays may be geometrically separate from one another. Therefore, for each voxel in a slice of 3D beamformed data generated from raw data generated by two or more subarrays of detector elements in a 2D multi-element detector array, there is an expected phase difference between the phases derived from different subarrays due to the geometry of the configuration and the received signal properties. Referring to FIG. 5A, a conceptual diagram 501 is shown for a set of two subarrays of detector elements, in which θ is the expected beam angle to a given voxel in 3D space, d is the distance between the centers of the two subarrays: subarray 1 and subarray 2 (the centers being depicted as $C_{subarray1}$ and $C_{subarray2}$) and λ is the wavelength of the signal determined from the carrier frequency of the signal and the speed of the signal in the fluid. From these values, an expected phase difference resulting from separation of the centers of subarray centers may be expressed as:

$$\Delta\varphi_{expected} = \frac{2\pi d \sin\theta_{expected}}{\lambda}, \quad (1)$$

in which $\Delta\varphi_{expected}$ is the expected phase difference between signals due to respective paths from the point of reflection and $C_{subarray1}$ and $C_{subarray2}$ being a difference of $\Delta R_{expected}$. In the event that more than two subarrays are used, the phase difference is approximately a linear function of the subarray positions.

Figure 5B:
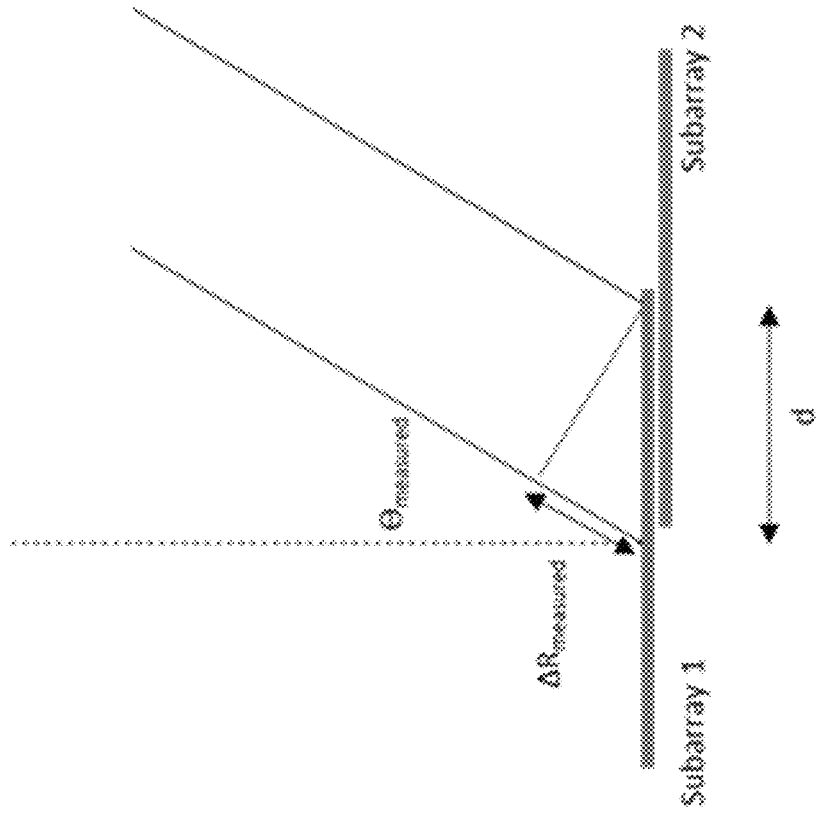

Referring to FIG. 5B, a conceptual diagram 511 is shown, depicting a measured phase difference $\Delta\varphi_{measured}$, which corresponds to a phase difference between signals resulting from the respective paths from the point of reflection $C_{subarray1}$ and $C_{subarray2}$ being a difference of $\Delta R_{measured}$, as calculated from the slice of beamformed data volume using subarray 1 and subarray 2. By comparing the actual measured phase difference between phases associated with a given beam in beamformed data calculated from two or more spatially separated subarrays ($\Delta\varphi_{measured}$) with the expected phase difference for that beam angle ($\Delta\varphi_{expected}$), the sonar computing device may estimate the actual location of the actual source relative to the beamformed angle within the beam.

Figure 5C:
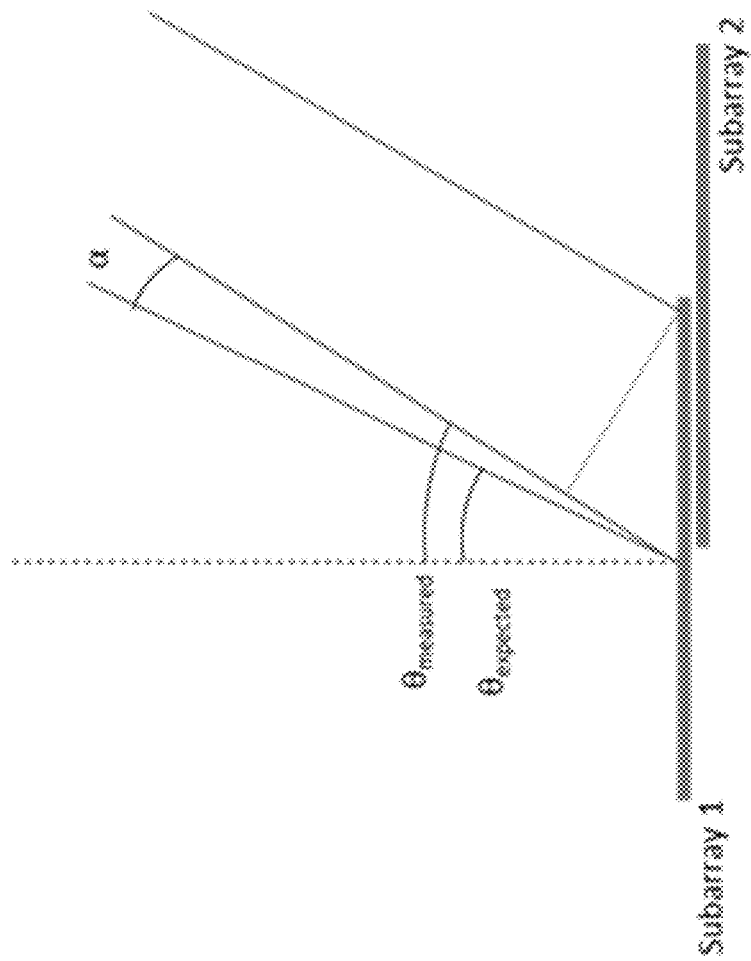

Referring now to FIG. 5C, a conceptual diagram 521 is shown defining a sub-beam angle α for beamforming angle θ. The sonar computing device may measure, for each beam in the original beamformed data derived from the full multi-element detector array raw data, the sub-beam angle α, which serves as a sub-beam angle correction. In the event that the sonar computing device uses multiple subarrays, the difference between $\theta_{expected}$ and measured phase angles $\theta_i$ is an approximately linear function (assuming a planar wave) of the subarray center position in the entire array along the direction of a subarray offset $x_i$. The measured phase angle may be represented as:

$$\theta_i = kx_i + b. \quad (2)$$

The sonar computing device may measure phase error for each subarray beamformed data set. To do so, the sonar computing device may subtract the expected phase by the measured phase on each beam (e.g., by multiplication by a complex exponential). Using $\theta_i$ and $x_i$, the sonar computing device may determine the values k and b by linear regression for each beam. The sub-beam angle correction a, can be determined as:

$$\alpha = \sin^{-1}\left(\frac{k}{2\pi\lambda}\right), \quad (3)$$

in which λ is the signal wavelength. The sonar computing device may shift each data point in the original full multi-element array beamformed data to the true source position as a function of the angle correction. The sonar computing device may reject any points where the estimated correction is above a certain threshold that may be fixed or variable per slice. The threshold may be manually chosen or automatically determined. For example, the threshold for rejecting points may be set to correspond to the chosen angular resolution of the beamforming process in a given slice, thereby ensuring that a given reflector only appears in one of the computed beams, rather than being spread over multiple beams.

Figure 6:
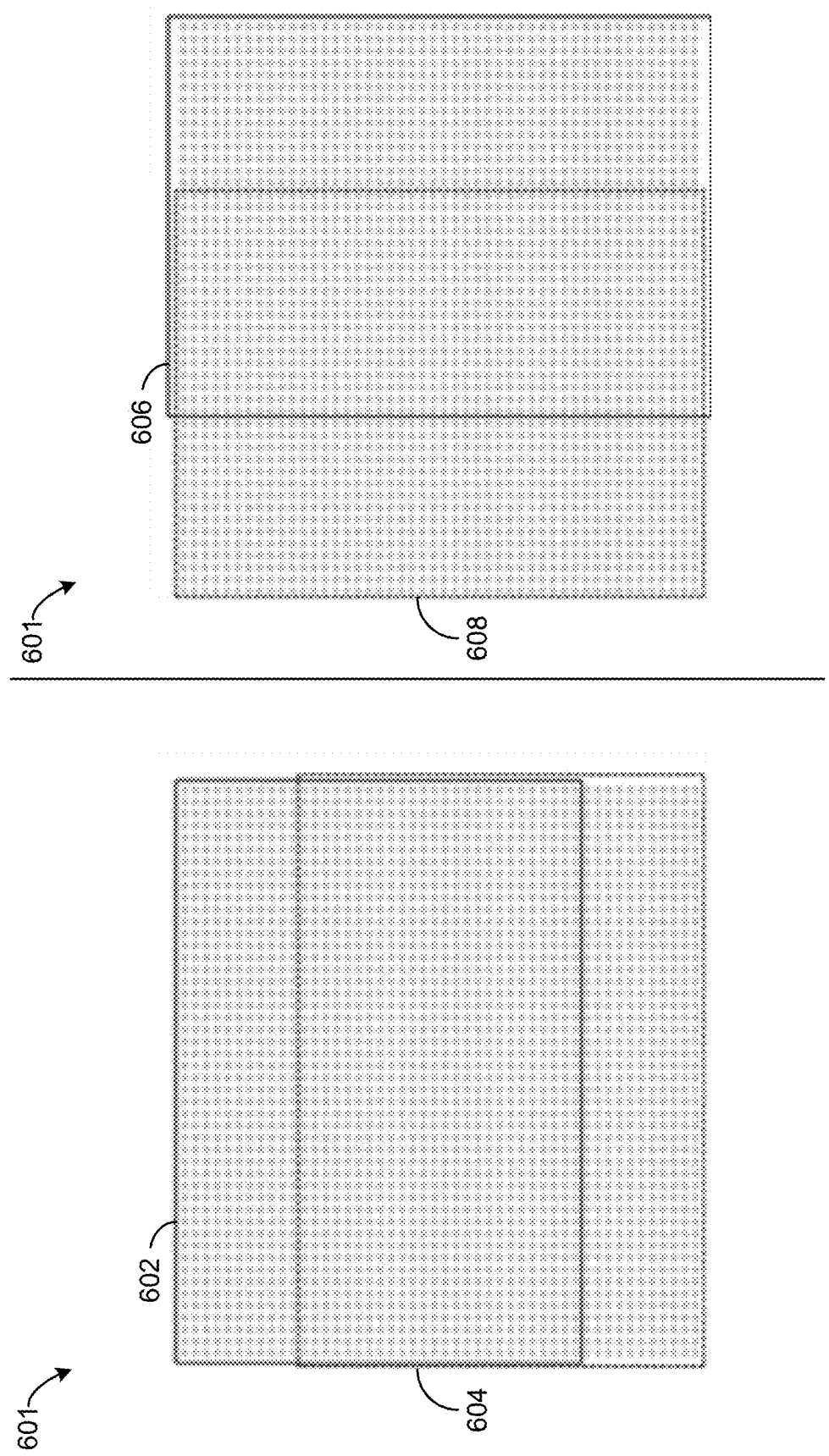
FIG. 6 is a conceptual diagram of example selections of subarrays of a multi-element detector array for use in correcting beamformed data.

Referring to FIG. 6, example selections of sets of subarrays of a multi-element detector array 601 in the detector 108 are shown for use in correcting beamformed data. Illustratively, the array 601 represents a 48×48 element array. The left-hand portion of FIG. 6 depicts a detector element subarray set configuration of the array 601 in a vertical split-aperture processing configuration. The detector elements within the solid line 602 are of a first subarray and the detector elements within the dotted line 604 are of a second subarray. The right-hand portion of FIG. 6 depicts a detector element subarray set configuration of the array 601 in a horizontal split-aperture processing configuration. The detector elements within the solid line 606 are of a first subarray and the detector elements within the dotted line 608 are of a second subarray. As shown, in each subarray set configuration, a portion of the first and second subarrays each overlap with one another and are of equal dimensions. Although not required, shared elements and equal dimensions between subarrays allows for a more precise correction for the beamformed data. Selection of the configuration can be based on user preference. For instance, generally beamforming of raw data representing a horizontal seabed requires a significant degree of correction. In such a case, it may be beneficial for a vertical split-aperture processing configuration to contain more subarrays than the horizontal split-aperture processing configuration.

Further, in any configuration, the number and geometry of subarrays may be manually or automatically determined. For example, the number of subarrays used for the split-aperture techniques may be two or more subarrays, with the amount in each direction varying. In practice, a selection of two overlapping subarrays in the horizontal direction and three overlapping subarrays in the vertical direction has been shown to be effective.

Figure 7:
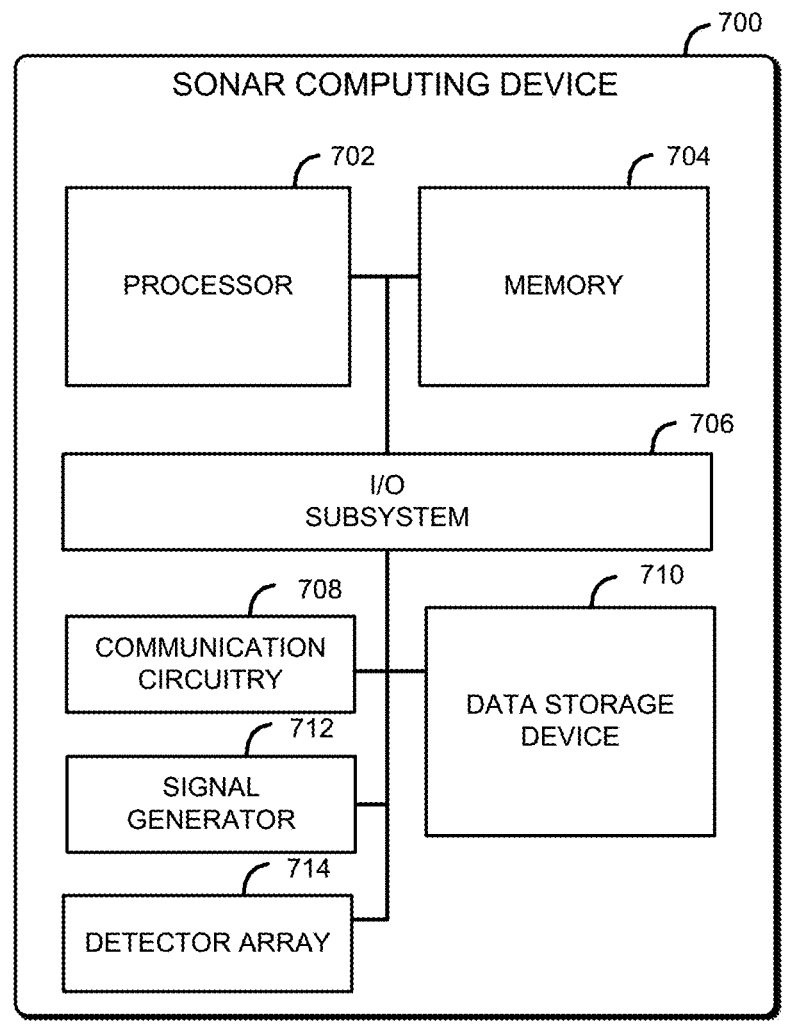
FIG. 7 is a simplified block diagram of a sonar computing device configured to correct beamformed data.

Referring now to FIG. 7, a sonar computing device 700 may be embodied as any type of device capable of performing the functions described herein, such as the detector array 714 generating raw data representing a 3D volumetric view of a space, dividing the detector array elements into two or more sets of subarrays, split-aperture processing the beamformed data generated by using the raw data generated by the full detector array 714 and subarrays, and correcting beamformed data as a function of the 2D split-aperture processing.

As shown, the illustrative sonar computing device 700 includes a processor 702, a memory 704, an input/output (I/O) subsystem 706, communication circuitry 708, a data storage device 710, a signal generator 712, and a detector array 714. Of course, in other embodiments, the sonar computing device 700 may include other or additional components, such as those commonly found in a computer (e.g., display, peripheral devices, etc.) or as part of sonar equipment. Additionally, in some embodiments, one or more of the illustrative components may be incorporated in, or otherwise form a portion of, another component.

The processor 702 may be embodied as one or more processors, each processor being a type capable of performing the functions described herein. For example, the processor 702 may be embodied as a single or multi-core processor(s), a microcontroller, or other processor or processing/controlling circuit. In some embodiments, the processor 702 may be embodied as, include, or be coupled to a field programmable gate array (FPGA), an application-specific integrated circuit (ASIC), reconfigurable hardware or hardware circuitry, or other specialized hardware to facilitate performance of the functions described herein.

The memory 704 may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, all or a portion of the memory 704 may be integrated into the processor 702.

The processor 702 and the memory 704 are communicatively coupled with other components of the sonar computing device 700 via the I/O subsystem 706, which may be embodied as circuitry and/or components to facilitate input/output operations with the processor 702 and/or the memory 704 and other components of the sonar computing device 700. For example, the I/O subsystem 706 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 706 may form a portion of a system-on-a-chip (SoC) and be incorporated, along with one or more of the processor 702, the memory 704, and other components of the sonar computing device 700.

The communication circuitry 708 may be embodied as any communication circuit, device, or collection thereof, capable of enabling communications over a network between the sonar computing device 700 and other devices (e.g., a management console on the sea vessel 102). The communication circuitry 708 may be configured to use any one or more communication technology (e.g., wired, wireless, and/or cellular communications) and associated protocols (e.g., Ethernet, Bluetooth®, Wi-Fi®, WiMAX, 5G-based protocols, etc.) to effect such communication. For example, to do so, the communication circuitry 708 may include a network interface controller (NIC, not shown), embodied as one or more add-in-boards, daughtercards, controller chips, chipsets, or other devices that may be used by the sonar computing device 700 for network communications with remote devices. For example, the NIC may be embodied as an expansion card coupled to the I/O subsystem 706 over an expansion bus such as PCI Express.

The illustrative data storage device 710 may be embodied as any type of devices configured for short-term or long-term storage of data such as, for example, memory devices and circuits, memory cards, hard disk drives (HDDs), solid-state drives (SSDs), or other data storage devices. The data storage device 710 may include a system partition that stores data and firmware code for the data storage device 710. The data storage device 710 may also include an operating system partition that stores data files and executables for an operating system.

The signal generator 712 may be embodied as any type of device or circuitry capable of generating sonar pulse signals and transmitting the sonar pulse signals in a physical space. The detector array 714 may be embodied as any type of device or circuitry capable of receiving signals reflected by objects in response to contact with the generated sonar pulse signals. The detector array 714 may include a two-dimensional array of detector elements (e.g., hydrophones) arranged in a grid, e.g., a 48×48 grid comprising approximately 2,304 receive elements. Although depicted as separate components, the signal generator 712 and detector array 714 may be incorporated into a sonar equipment device housed within the sonar computing device 700.

The sonar computing device 700 may establish an environment during operation in which the functions described herein are performed. The environment includes logic that may be carried out by one or more components of the sonar computing device 700 by execution of the processor 702, such as the signal generator 712, detector array 714, and memory 704.

Figure 8:
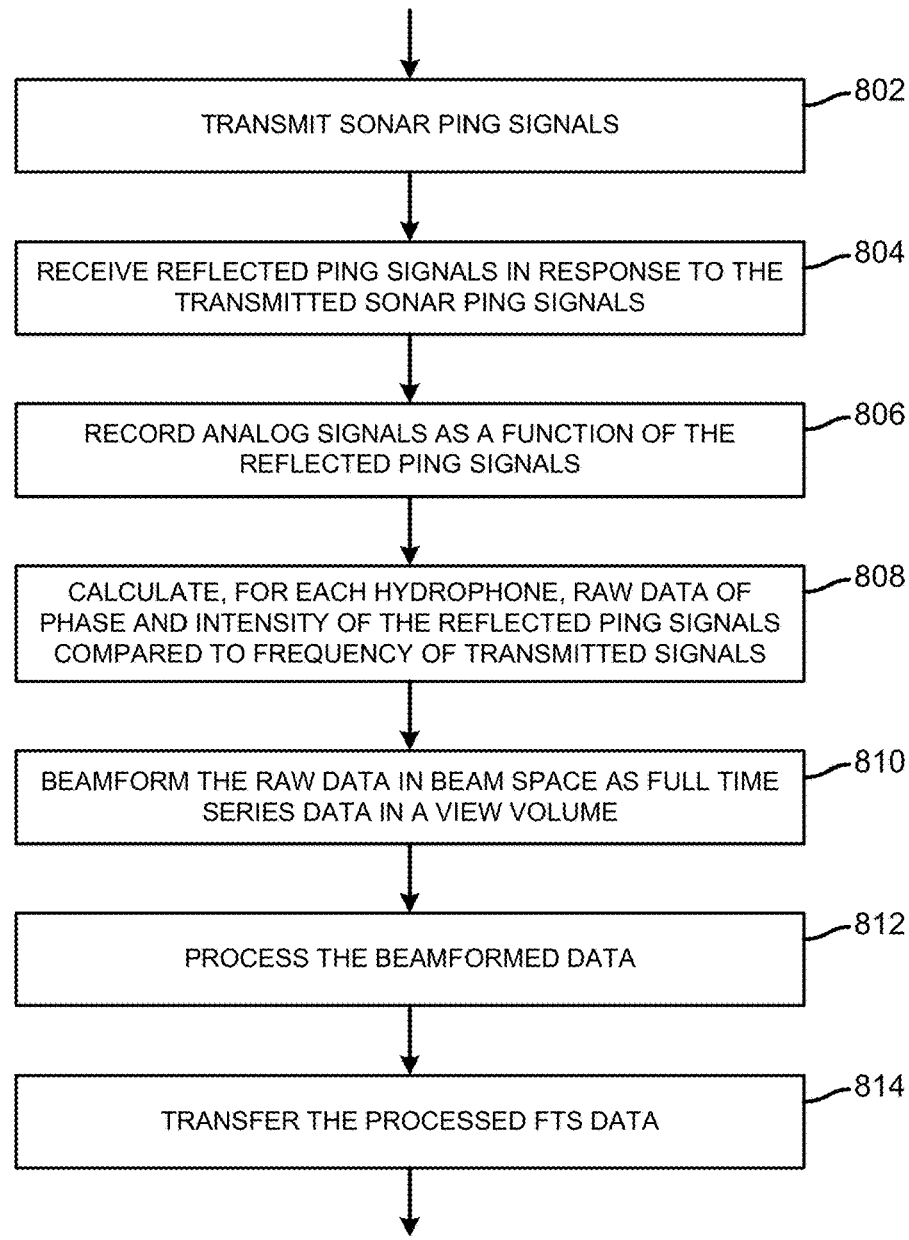
FIG. 8 is a simplified flow diagram of a method for obtaining and transmitting sonar imaging data in a three-dimensional volumetric space.

Referring now to FIG. 8, the sonar computing device 700, in operation, performs a method 800 for obtaining and managing sonar imaging data for further processing. Particularly, the method 800 provides an example workflow in which beamforming correction may be applied. As shown, the method 800 begins in block 802, in which the sonar computing device 700 transmits one or more sonar ping signals into a volume of fluid. Objects in the volume may reflect ping signals in response. In block 804, the sonar computing device 700 receives the reflected ping signals via the detector array.

In block 806, the sonar computing device 700, via each element in the detector array, records analog signals as a function of the reflected ping signals. Further, in block 808, each element in the detector array calculates raw data of the reflected ping signals. Particularly, each detector array element calculates phase and magnitude values relative to the frequency of the signal transmitted. In block 810, the sonar computing device 700 performs beamforming techniques on the calculated raw data to produce beamformed, or full time series, data representing the view volume.

In block 812, the sonar computing device 700 may process the beamformed data. For example, the sonar computing device 700 may clip less meaningful data from the full time series data. One example of clipping may be based on an average intensity or magnitude and the standard deviation values of the voxels per slice. Thereafter, the sonar computing device 700 may normalize the voxel values in each slice and compress the normalized data. Through multiple beamforming steps using raw data from the full multi-element detector array and two or more sets of sub-arrays disposed in two directions, the sonar computing device 700 may apply beamforming corrections based on the split-aperture processing techniques according to the embodiments described herein. These techniques are disclosed in further detail relative to FIGS. 9 and 10. In block 814, the sonar computing device 700 may transmit the compressed data for further processing by the sonar computing device 700 (or by a management console on the sea vessel 102). For example, the sonar computing device 700 may transmit the data to another processing function within the sonar computing device 700, such as a visualization or segmenting function. As another example, the sonar computing device 700 may transmit the data to a topside system on the sea vessel 102, such as a management console. As yet another example, sonar computing device 700 may transmit the data to a remote system outside the sea vessel 102, such as a cloud storage server. Once transmitted, the data may be uncompressed and further processed or stored.

Figure 9:
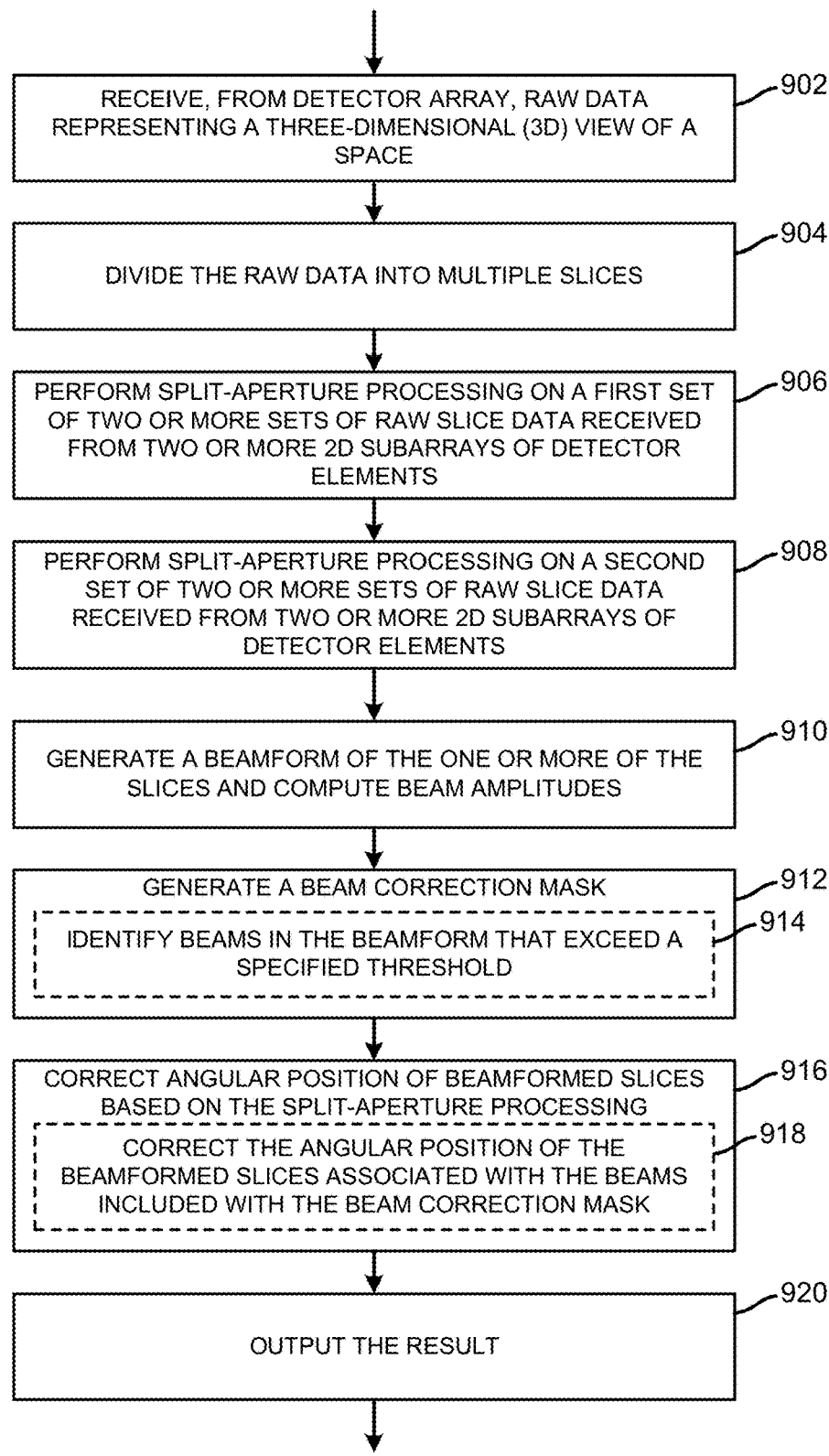
FIG. 9 is a simplified flow diagram of a method for correcting beamformed data.

Referring now to FIG. 9, the sonar computing device 700, in operation, may perform a method 900 for correcting beamformed data based on split-aperture processing, according to an embodiment. As shown, the method 900 begins in block 902, in which the sonar computing device 700 receives, from each element of a detector array (e.g., the detector array 714), raw data in phase space comprised of real and imaginary components of a signal at a selected frequency. In block 904, the sonar computing device 700 may divide the raw data into multiple raw data slices, each slice having an average slice distance (or range) from the receiver, which may be set to match the desired range resolution, and a corresponding average slice time. In block 906, the sonar computing device 700 performs split-aperture processing on a first set of two or more sets of the raw slice data received from the channel electronics of two or more 2D subarrays of detector elements with centers geometrically separate from one another in a first direction. In block 908, the sonar computing device 700 performs split-aperture processing on a second set of two or more subsets of raw slice data received from the channel electronics of two or more 2D subarrays of detector elements with centers geometrically separate from one another in a second direction. This process is further described relative to FIG. 10.

In block 910, the sonar computing device 700 generates beamformed data from the raw data received from the entire array of detector elements. The sonar computing device 700 beamforms the entire array to provide a magnitude value, optionally a magnitude and phase value, per beam in a given slice. The sonar computing device 700 may perform a beamforming technique on the one or more slices. In block 912, the whole array beamformed average magnitude, per slice or per volume, may be used as a threshold to reduce processing by creating a beam correction mask. For instance, to do so, in block 914, beams with a magnitude above a specified threshold (e.g., within 12 dB of a maximum average magnitude value of the slice or selection) may be identified to create a beam correction mask to reduce the number of voxels, or beam positions within a given slice, to undergo a split-aperture position correction. Other methods of generating a beam correction mask, for example using a function of a weighting associated with the slice based on the slice average magnitude and/or the inverse standard deviation of the values of magnitude associated with voxels within a given slice and/or the magnitude values associated with neighboring voxels. The processing described in blocks 906-912 can be performed sequentially or in parallel.

In block 916, the sonar computing device 700 corrects the angular position of beamformed slices based on the split-aperture processing.

In an embodiment, in block 918, the sonar computing device 700 corrects the angular position of beams included in the correction mask. The sonar computing device 700 may determine vertical and horizontal corrections using phase data ascertained from the sets of subarrays compared to the expected phase data per beam for a given subarray geometry (described relative to FIG. 10) in the mask for the beamformed data of the entire array. Once the 2D corrections for all beams within the mask are determined, the sonar computing device 700 may adjust the beam positions within the slice for the beamformed data of the entire array. Further, the sonar computing device 700 may interpolate corrected beam positions onto an output grid and add a beam amplitude (e.g., magnitude) to the interpolated position. Alternatively, the sonar computing device 700 may remove points from the slice for the beamformed data of the entire array by identifying points whose vertical and horizontal angular corrections exceed a certain threshold.

In block 920, the sonar computing device 700 may output the resulting grid. The resulting grid is a beamformed data grid that can be in a beam-space, world-space, etc. Advantageously, the techniques provide for a split-aperture processing of 3D beamformed data that results in a 2D angular correction being computed for each voxel, as opposed to merely a one-dimensional correction used in 2D beamforming.

Figure 10:
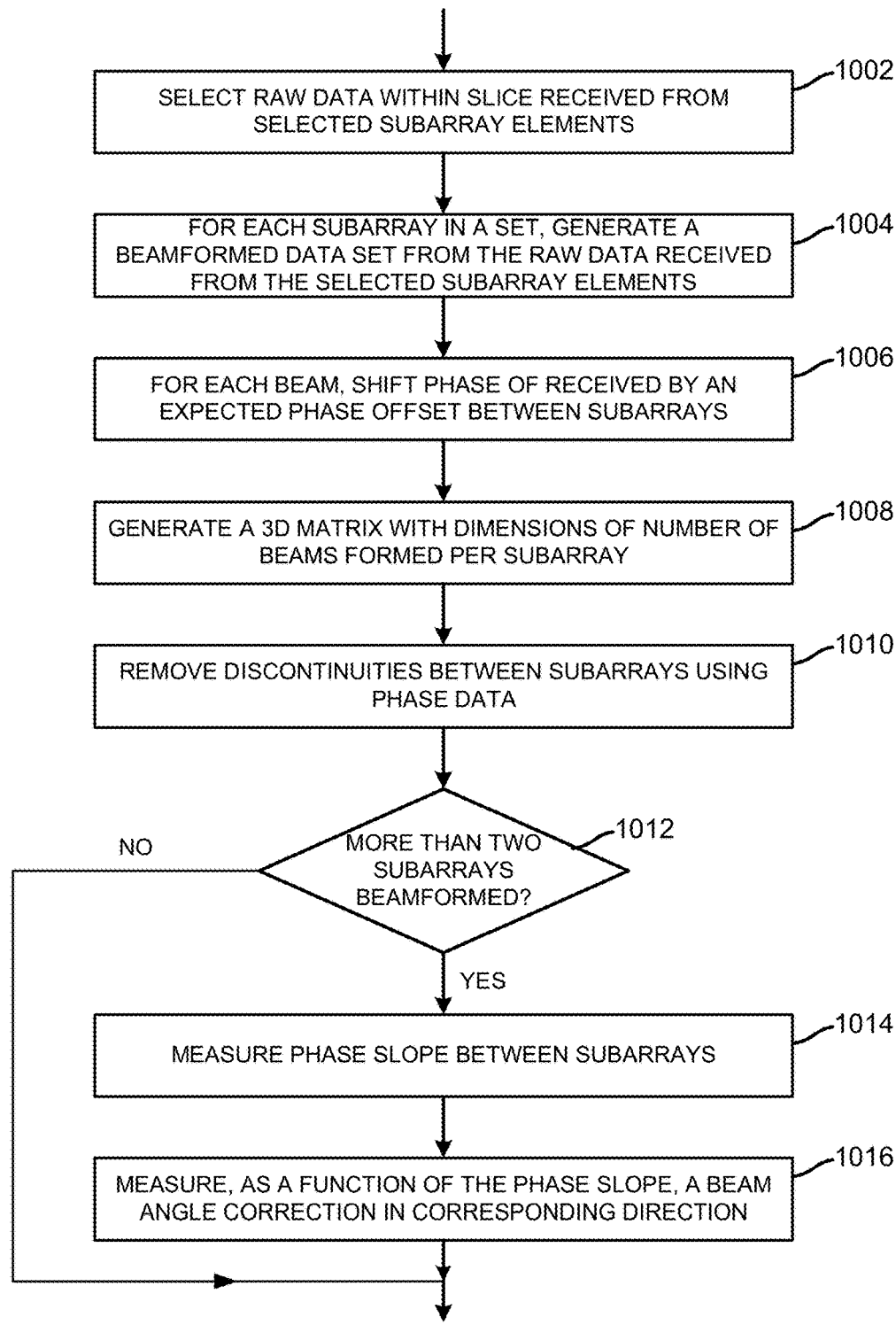
FIG. 10 is a simplified flow diagram of a method for performing subarray slice beamforming phase processing.

Referring now to FIG. 10, the sonar computing device 700, in operation, for a first set of subarrays of the multi-element detector array, the set comprising subarrays having centers geometrically separate along a given direction and for a given raw data slice, may perform a method 1000 for performing subarray slice beamforming phase processing, according to an embodiment. The method 1000 may be executed in parallel or sequentially to the step of method 900 pertaining to generating a beamformed data set using elements of the entire array. Further, the method 1000 may be executed in parallel or sequentially to the method 1000 being performed on a further set of the subarrays of the multi-element detector array, the set comprising subarrays having centers geometrically separate along a further direction, the direction non-parallel to the direction of the first set of subarrays. For example, the method 1000 may be executed on a set of subarrays horizontally disposed to one another while also being executed on a set of subarrays vertically disposed to one another.

As shown, the method 1000 begins in block 1002, in which the sonar computing device 700 selects raw data within the slice received from selected subarray elements. As stated, the number and geometry of the sets of subarrays in the detector array may be determined manually or automatically. For each subarray, elements may be contiguous. The sonar computing device 700 may apply a window function to the raw signal data within a slice corresponding to the selected subarray elements. Doing so allows the sonar computing device 700 to condition the beamforming output. One example that the sonar computing device 700 may use is a Dolph-Chebyshev window function to provide a certain beam width and sidelobe level reduction.

In block 1004, the sonar computing device 700, for each subarray in a set, generates a beamformed data set from raw data received from the selected subarray elements. Doing so generates one or more beams in the beamformed data set, each having a value or values associated with the beam, such as phase and magnitude. The beams may overlap with one another. Examples of beamforming techniques include a Fast Fourier Transform (FFT) beamforming. The number of beams generated by the beamforming technique may be predetermined or manually adjusted, e.g., based on factors such as a target resolution. The sonar computing device 700 repeats block 1004 to generate a beamformed data set for each subarray.

In block 1006, the sonar computing device 700, for each beam, shifts the phase of received signals at a voxel by an expected phase offset between subarrays. The sonar computing device 700 may use one of any of the selected subarray centers as a reference subarray for shifting. In block 1008, the sonar computing device 700 generates a 3D matrix with dimensions being the number of beams formed per subarray beamformed data set in the two dimensions and the number of subarrays in a set. The sonar computing device 700 may populate the 3D matrix with phase data. In addition, the sonar computing device 700 may include other data in the 3D matrix, such as magnitude. In block 1010, the sonar computing device 700 removes discontinuities between phase data associated with a given beam position in the 3D matrix. One example of doing so includes determining phase data for each subarray for a given beam position.

The sonar computing device 700 may then compare the phase data generated using each subarray with one another for a given beam position. The sonar computing device 700 may then correct via unwrapping to remove discontinuities in the phase values that can be introduced by forcing the phase to take a value between π and −π. In block 1012, the sonar computing device 700 determines whether more than two subarrays are within a set of subarrays being processed for the split-aperture processing techniques along a given direction. If so, then the method 1000 proceeds to block 1014, in which the sonar computing device 700 measures a phase slope between the selected subarrays. In block 1016, the sonar computing device 700 measures, as a function of the phase slope, a beam angle correction in a corresponding direction. For example, if the method 1000 is executed on a horizontal set of subarrays, the sonar computing device 700 measures beam angle corrections in the horizontal direction. As another example, if the method 1000 is executed on a vertical set of subarrays, the sonar computing device 700 measures the beam angle corrections in the vertical direction.

The resulting data from method 1000 may be used in performing a beamforming correction as described in FIG. 9.

EXAMPLES

Illustrative examples of the technologies disclosed herein are provided below. An embodiment of the technologies may include any one or more, and any combination of, the examples described below.

Example 1 includes computer-implemented method for correcting beamformed data, the method comprising receiving, by a sonar computing device at two or more sets of two-dimensional (2D) subarrays of a detector array comprising a plurality of elements, raw data representing a three-dimensional (3D) volumetric view of a space, wherein a first set of 2D subarrays of the two or more sets of 2D subarrays includes elements of the detector array along a first direction and wherein a second set of 2D subarrays of the two or more sets of 2D subarrays includes elements of the detector array along a second direction; subdividing, by the sonar computing device, the raw data into a plurality of slices, each slice corresponding to raw data received at a given range from the detector array; beamforming, by the sonar computing device, the raw data to obtain a plurality of beams; and correcting resulting beamformed data of the beamforming by, for at least one of the plurality of data slices: obtaining, by the sonar computing device, first phase data from a first subset of the first set of 2D subarrays, obtaining, by the sonar computing device, second phase data from a second subset of the first set of 2D subarrays, correcting, by the sonar computing device, a beam position of each of the plurality of beams in the first direction and the second direction per voxel based on the first phase data and the second phase data, and interpolating, by the sonar computing device, the corrected beam position of each of the plurality of beams to an output grid.

Example 2 includes the subject matter of Example 1, and wherein the first subset corresponds to raw data received from the first set of 2D subarrays in which a center of each element in the first subset is physically separated along the first direction, and wherein the second subset corresponds to raw data received from the second set of 2D subarrays in which a center of each element in the second subset is physically separated along the second direction.

Example 3 includes the subject matter of any of Examples 1 and 2, and wherein obtaining the first phase data comprises beamforming the raw data in the first subset into a series of 2D matrices representing view volumes comprising a voxel per beam of the beamformed raw data in the first subset, the voxel including a phase value; and for one or more beams in the beamformed raw data in the first subset, calculating a measured phase difference between the beams in the beamformed raw data in the first subset.

Example 4 includes the subject matter of any of Examples 1-3, and wherein obtaining the second phase data comprises beamforming the raw data in the second subset into a series of 2D matrices representing view volumes comprising a voxel per beam of the beamformed raw data in the second subset, the voxel including a phase value; and for one or more beams in the beamformed raw data in the second subset, calculating a measured phase difference between the beams in the beamformed raw data in the second subset.

Example 5 includes the subject matter of any of Examples 1-4, and wherein correcting the beam position of each of the plurality of beams in the first direction and the second direction comprises correcting the beam position of each of the plurality of beams in the first direction and the second direction based on a comparison of the calculated measured phase differences of the first and second subsets and an expected phase difference per voxel.

Example 6 includes the subject matter of any of Examples 1-5, and wherein correcting the beam position of each of the plurality of beams further comprises generating, by the sonar computing device, from the measured phase differences and the expected phase difference per voxel, a beam angle correction value for the first direction and the second direction.

Example 7 includes the subject matter of any of Examples 1-6, and further comprising, for the at least one of the plurality of data slices, generating, by the sonar computing device, a mask comprising one or more of the plurality of beams having a value exceeding a specified threshold.

Example 8 includes the subject matter of any of Examples 1-7, and further comprising, removing one or more points from the slice by identifying points in which an angular correction in the first direction and an angular correction in the second direction exceed a specified threshold.

Example 9 includes the subject matter of any of Examples 1-8, and wherein correcting the beam position of each of the plurality of beams in the first direction and the second direction comprises correcting the beam position of the one or more of the plurality of beams in the generated mask.

Example 10 includes the subject matter of any of Examples 1-9, and wherein the first direction and the second direction are orthogonal relative to one another.

Example 11 includes the subject matter of any of Examples 1-10, and wherein an amount of 2D subarrays in the first set of 2D subarrays is greater than an amount of 2D subarrays in the second set of 2D subarrays.

Example 12 includes the subject matter of any of claims 1-11, and wherein correcting the resulting beamformed data of the beamforming performed on more than the at least one of the plurality of data slices and wherein more than one data point in each beam is corrected.

Example 13 includes a sonar computing device comprising a processor; a detector array comprising a plurality of elements; and a memory storing a plurality of instructions, which, when executed on the processor, causes the sonar computing device to receive, at two or more sets of two-dimensional (2D) subarrays of the detector array, raw data representing a three-dimensional (3D) volumetric view of a space, wherein a first set of 2D subarrays of the two or more sets of 2D subarrays includes elements of the detector array along a first direction and wherein a second set of 2D subarrays of the two or more sets of 2D subarrays includes elements of the detector array along a second direction; subdivide the raw data into a plurality of slices, each slice corresponding to raw data received at a given range from the detector array; beamform the raw data to obtain a plurality of beams; and correct resulting beamformed data of the beamforming by, for at least one of the plurality of data slices obtaining first phase data from a first subset of the first set of 2D subarrays, obtaining second phase data from a second subset of the first set of 2D subarrays, correcting a beam position of each of the plurality of beams in the first direction and the second direction per voxel based on the first phase data and the second phase data, and interpolating the corrected beam position of each of the plurality of beams to an output grid.

Example 14 includes the subject matter of Example 13, and wherein the first subset corresponds to raw data received from the first set of 2D subarrays in which a center of each element in the first subset is physically separated along the first direction, wherein the second subset corresponds to raw data received from the second set of 2D subarrays in which a center of each element in the second subset is physically separated along the second direction; and wherein obtaining the first phase data comprises beamforming the raw data in the first subset into a series of 2D matrices representing view volumes comprising a voxel per beam of the beamformed raw data in the first subset, the voxel including a phase value; and for one or more beams in the beamformed raw data in the first subset, calculating a measured phase difference between the beams in the beamformed raw data in the first subset.

Example 15 includes the subject matter of any of Examples 13 and 14, and wherein obtaining the second phase data comprises beamforming the raw data in the second subset into a series of 2D matrices representing view volumes comprising a voxel per beam of the beamformed raw data in the second subset, the voxel including a phase value; and for one or more beams in the beamformed raw data in the second subset, calculating a measured phase difference between the beams in the beamformed raw data in the second subset; wherein correcting the beam position of each of the plurality of beams in the first direction and the second direction comprises correcting the beam position of each of the plurality of beams in the first direction and the second direction based on a comparison of the calculated measured phase differences of the first and second subsets and an expected phase difference per voxel.

Example 16 includes the subject matter of any of Examples 13-15, and wherein to correct the beam position of each of the plurality of beams further comprises to generate from the measured phase differences and the expected phase difference per voxel, a beam angle correction value for the first direction and the second direction.

Example 17 includes the subject matter of any of Examples 13-16, and wherein the plurality of instructions further causes the sonar computing device to, for the at least one of the plurality of data slices, generate a mask comprising one or more of the plurality of beams having a value exceeding a specified threshold.

Example 18 includes the subject matter of any of Examples 13-17, and wherein the plurality of instructions further causes the sonar computing device to remove one or more points from the slice by identifying points in which an angular correction in the first direction and an angular correction in the second direction exceed a specified threshold.

Example 19 includes the subject matter of any of Examples 13-18, wherein correcting the beam position of each of the plurality of beams in the first direction and the second direction comprises correcting the beam position of the one or more of the plurality of beams in the generated mask.

Example 20 includes one or more machine-readable storage media storing a plurality of instructions, which, when executed on a processor, causes a sonar computing device to receive, at two or more sets of two-dimensional (2D) subarrays of a detector array comprising a plurality of elements, raw data representing a three-dimensional (3D) volumetric view of a space, wherein a first set of 2D subarrays of the two or more sets of 2D subarrays includes elements of the detector array along a first direction and wherein a second set of 2D subarrays of the two or more sets of 2D subarrays includes elements of the detector array along a second direction; subdivide the raw data into a plurality of slices, each slice corresponding to raw data received at a given range from the detector array; beamform the raw data to obtain a plurality of beams; and correct resulting beamformed data of the beamforming by, for at least one of the plurality of data slices obtaining, by the sonar computing device, first phase data from a first subset of the first set of 2D subarrays, obtaining, by the sonar computing device, second phase data from a second subset of the first set of 2D subarrays, correcting, by the sonar computing device, a beam position of each of the plurality of beams in the first direction and the second direction per voxel based on the first phase data and the second phase data, and interpolating, by the sonar computing device, the corrected beam position of each of the plurality of beams to an output grid.

The invention claimed is:

1. A computer-implemented method for correcting beamformed data, the method comprising:
  receiving, by a sonar computing device at two or more sets of two-dimensional (2D) subarrays of a detector array comprising a plurality of elements, raw data representing a three-dimensional (3D) volumetric view of a space, wherein a first set of 2D subarrays of the two or more sets of 2D subarrays includes elements of the detector array along a first direction and wherein a second set of 2D subarrays of the two or more sets of 2D subarrays includes elements of the detector array along a second direction;
  subdividing, by the sonar computing device, the raw data into a plurality of slices, each slice corresponding to raw data received at a given range from the detector array;
  beamforming, by the sonar computing device, the raw data to obtain a plurality of beams; and
  correcting resulting beamformed data of the beamforming by, for at least one of the plurality of data slices:
    obtaining, by the sonar computing device, first phase data from a first subset of the first set of 2D subarrays,
    obtaining, by the sonar computing device, second phase data from a second subset of the second set of 2D subarrays,
    correcting, by the sonar computing device, a beam position of each of the plurality of beams in the first direction and the second direction per voxel based on the first phase data and the second phase data, and interpolating, by the sonar computing device, the corrected beam position of each of the plurality of beams to an output grid.

2. The computer-implemented method of claim 1, wherein the first subset corresponds to raw data received from the first set of 2D subarrays in which a center of each element in the first subset is physically separated along the first direction, and wherein the second subset corresponds to raw data received from the second set of 2D subarrays in which a center of each element in the second subset is physically separated along the second direction.

3. The computer-implemented method of claim 2, wherein obtaining the first phase data comprises:
beamforming the raw data in the first subset into a series of 2D matrices representing view volumes comprising a voxel per beam of the beamformed raw data in the first subset, the voxel including a phase value; and
for one or more beams in the beamformed raw data in the first subset, calculating a measured phase difference between the beams in the beamformed raw data in the first subset.

4. The computer-implemented method of claim 3, wherein obtaining the second phase data comprises:
beamforming the raw data in the second subset into a series of 2D matrices representing view volumes comprising a voxel per beam of the beamformed raw data in the second subset, the voxel including a phase value; and
for one or more beams in the beamformed raw data in the second subset, calculating a measured phase difference between the beams in the beamformed raw data in the second subset.

5. The computer-implemented method of claim 4, wherein correcting the beam position of each of the plurality of beams in the first direction and the second direction comprises correcting the beam position of each of the plurality of beams in the first direction and the second direction based on a comparison of the calculated measured phase differences of the first and second subsets and an expected phase difference per voxel.

6. The computer-implemented method of claim 5, wherein correcting the beam position of each of the plurality of beams further comprises generating, by the sonar computing device, from the measured phase differences and the expected phase difference per voxel, a beam angle correction value for the first direction and the second direction.

7. The computer-implemented method of claim 1, further comprising, for the at least one of the plurality of data slices, generating, by the sonar computing device, a mask comprising one or more of the plurality of beams having a value exceeding a specified threshold.

8. The computer-implemented method of claim 7, further comprising, removing one or more points from the slice by identifying points in which an angular correction in the first direction and an angular correction in the second direction exceed a specified threshold.

9. The computer-implemented method of claim 7, wherein correcting the beam position of each of the plurality of beams in the first direction and the second direction comprises correcting the beam position of the one or more of the plurality of beams in the generated mask.

10. The computer-implemented method of claim 1, wherein the first direction and the second direction are orthogonal relative to one another.

11. The computer-implemented method of claim 1, wherein an amount of 2D subarrays in the first set of 2D subarrays is greater than an amount of 2D subarrays in the second set of 2D subarrays.

12. The computer-implemented method of claim 1, wherein correcting the resulting beamformed data of the beamforming performed on more than the at least one of the plurality of data slices and wherein more than one data point in each beam is corrected.

13. A sonar computing device, comprising:
a processor;
a detector array comprising a plurality of elements; and
a memory storing a plurality of instructions, which, when executed on the processor, causes the sonar computing device to:
receive, at two or more sets of two-dimensional (2D) subarrays of the detector array, raw data representing a three-dimensional (3D) volumetric view of a space, wherein a first set of 2D subarrays of the two or more sets of 2D subarrays includes elements of the detector array along a first direction and wherein a second set of 2D subarrays of the two or more sets of 2D subarrays includes elements of the detector array along a second direction;
subdivide the raw data into a plurality of slices, each slice corresponding to raw data received at a given range from the detector array;
beamform the raw data to obtain a plurality of beams; and
correct resulting beamformed data of the beamforming by, for at least one of the plurality of data slices:
obtaining first phase data from a first subset of the first set of 2D subarrays,
obtaining second phase data from a second subset of the second set of 2D subarrays,
correcting a beam position of each of the plurality of beams in the first direction and the second direction per voxel based on the first phase data and the second phase data, and
interpolating the corrected beam position of each of the plurality of beams to an output grid.

14. The sonar computing device of claim 13, wherein the first subset corresponds to raw data received from the first set of 2D subarrays in which a center of each element in the first subset is physically separated along the first direction, wherein the second subset corresponds to raw data received from the second set of 2D subarrays in which a center of each element in the second subset is physically separated along the second direction; and wherein obtaining the first phase data comprises:
beamforming the raw data in the first subset into a series of 2D matrices representing view volumes comprising a voxel per beam of the beamformed raw data in the first subset, the voxel including a phase value; and
for one or more beams in the beamformed raw data in the first subset, calculating a measured phase difference between the beams in the beamformed raw data in the first subset.

15. The sonar computing device of claim 14, wherein obtaining the second phase data comprises:
beamforming the raw data in the second subset into a series of 2D matrices representing view volumes comprising a voxel per beam of the beamformed raw data in the second subset, the voxel including a phase value; and for one or more beams in the beamformed raw data in the second subset, calculating a measured phase difference between the beams in the beamformed raw data in the second subset;

wherein correcting the beam position of each of the plurality of beams in the first direction and the second direction comprises correcting the beam position of each of the plurality of beams in the first direction and the second direction based on a comparison of the calculated measured phase differences of the first and second subsets and an expected phase difference per voxel.

16. The sonar computing device of claim 15, wherein to correct the beam position of each of the plurality of beams further comprises to generate from the measured phase differences and the expected phase difference per voxel, a beam angle correction value for the first direction and the second direction.

17. The sonar computing device of claim 13, wherein the plurality of instructions further causes the sonar computing device to, for the at least one of the plurality of data slices, generate a mask comprising one or more of the plurality of beams having a value exceeding a specified threshold.

18. The sonar computing device of claim 17, wherein the plurality of instructions further causes the sonar computing device to remove one or more points from the slice by identifying points in which an angular correction in the first direction and an angular correction in the second direction exceed a specified threshold.

19. The sonar computing device of claim 17, wherein correcting the beam position of each of the plurality of beams in the first direction and the second direction comprises correcting the beam position of the one or more of the plurality of beams in the generated mask.

20. One or more machine-readable storage media storing a plurality of instructions, which, when executed on a processor, causes a sonar computing device to:

receive, at two or more sets of two-dimensional (2D) subarrays of a detector array comprising a plurality of elements, raw data representing a three-dimensional (3D) volumetric view of a space, wherein a first set of 2D subarrays of the two or more sets of 2D subarrays includes elements of the detector array along a first direction and wherein a second set of 2D subarrays of the two or more sets of 2D subarrays includes elements of the detector array along a second direction;

subdivide the raw data into a plurality of slices, each slice corresponding to raw data received at a given range from the detector array;

beamform the raw data to obtain a plurality of beams; and correct resulting beamformed data of the beamforming by, for at least one of the plurality of data slices:
　obtaining, by the sonar computing device, first phase data from a first subset of the first set of 2D subarrays,
　obtaining, by the sonar computing device, second phase data from a second subset of the second set of 2D subarrays,
　correcting, by the sonar computing device, a beam position of each of the plurality of beams in the first direction and the second direction per voxel based on the first phase data and the second phase data, and
　interpolating, by the sonar computing device, the corrected beam position of each of the plurality of beams to an output grid.

* * * * *